March 16, 1926.
A. HARTIG
1,576,908
PROCESS FOR CUTTING TEETH ON SAW BLADES
Filed June 24, 1924
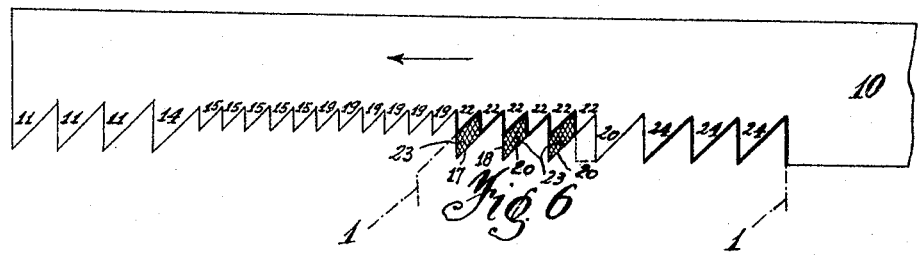
Fig. 6
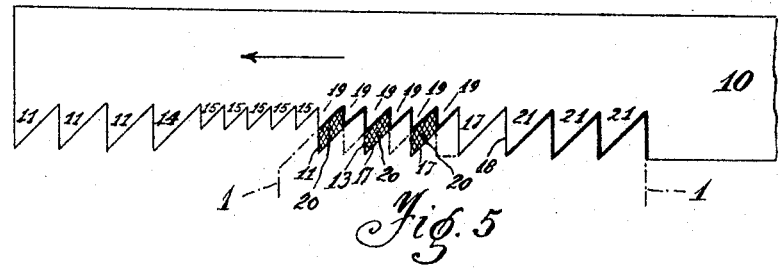
Fig. 5
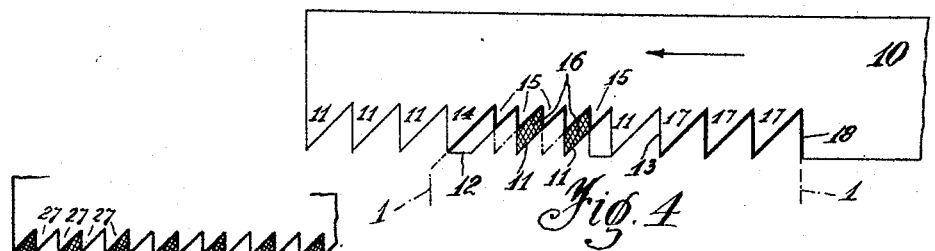
Fig. 4
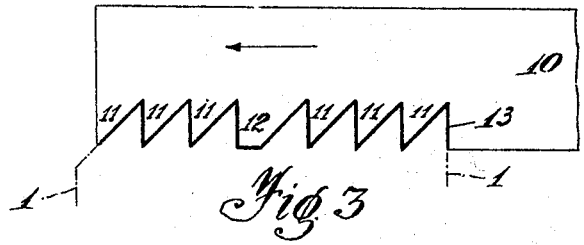
Fig. 3
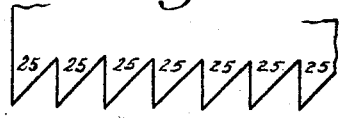
Fig. 8
Fig. 7
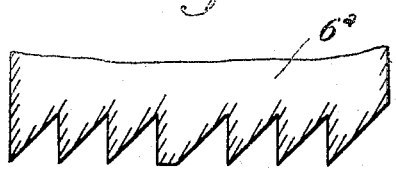
Fig. 2
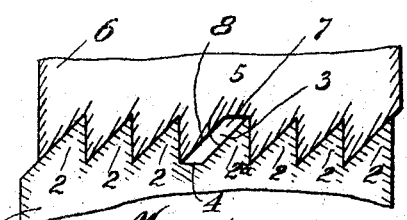
Fig. 1
INVENTOR.
Adolf Hartig
by Ralph Donath and
Paul Purchard
Attorneys Patented Mar. 16, 1926.

1,576,908

UNITED STATES PATENT OFFICE.

ADOLF HARTIG, OF EAST McKEESPORT, PENNSYLVANIA.

PROCESS FOR CUTTING TEETH ON SAW BLADES.

Application filed June 24, 1924. Serial No. 721,974.

*To all whom it may concern:*

Be it known that I, ADOLF HARTIG, citizen of the German Reich, residing at East McKeesport, in the county of Allegheny and State of Pennsylvania, have invented certain new and useful Improvements in Processes for Cutting Teeth on Saw Blades, of which the following is a specification.

This invention relates to saws and more in particular to a process and means for cutting the teeth on saw blades.

One of the main objects of the invention is to provide a process and means by which the teeth of saws may be cut sharp in one feeding operation of the blades through the cutting machine. Another object is to provide a process and means whereby the punches and dies used for cutting the teeth of the saw may be milled with the same milling cutter.

A further purpose of this invention is to provide means whereby several teeth of a saw blade may be cut simultaneously and continuously. Still another object is to provide a process which reduces the wear of the cutting elements and facilitates their manufacture.

Additional features and advantages of this invention will appear from the specification and from the drawing forming a part of this application and in which:

Fig. 1 is a diagrammatic representation of a punch and die used to cut saw blades in accordance with my process.

Fig. 2 shows a modified die which may be used in connection with the punch shown in Fig. 1.

Fig. 3 shows the shape of the teeth cut in a saw-blade after the first feed and the first stroke of the punching tool.

Fig. 4 is a view showing the appearance of the same saw-blade after the second feed and stroke.

Fig. 5 is a view showing the appearance of the same saw-blade after the third feed and stroke.

Fig. 6 shows the effect of the fourth feed and stroke on the same blade.

Fig. 7 is a fractional view showing the appearance of a saw after the first complete pass through cutting punches and dies built according to the practice now in common use.

Fig. 8 shows the final appearance of said blade after the second complete pass.

Referring to Fig. 1, it will be noted that the punch 1 is provided with seven teeth 2 of equal size having preferably the shape of a right angled isosceles triangle, which are divided in two groups of three and four teeth respectively by a central notch 3, of equal height, having the shape of a trapezium in which the side, or root, 4 is equal in width to one half the pitch of the triangular teeth, and in which the inclined side 5 is parallel to that of said teeth, that is, equal to forty-five degrees. These triangular teeth are made twice as large as the teeth ultimately desired for the saw.

As shown in Fig. 2, the die 6ª may be cut by means of a special milling cutter so that all its teeth will register fully within the corresponding notches in the punch; but, for reasons of economy and expediency, I prefer to cut the teeth in the die 6 with the same milling cutter as is used for making the punch 1. When this process is employed, there will be left between the die 6 and the punch 1 an open space 7 where the parallel inclined sides of the teeth 2ª and 8 do not touch. Although it may seem at first sight that this open space will produce a burred or uneven tooth at this place, practical experience has shown that there is sufficient support in the die for the saw-blade to enable the tooth 2ª in the punch to cut neatly through said blade. Moreover, any possible defect in the central tooth of the saw would be eliminated at the second stroke of the punch, as will be explained presently.

After the saw-blade has been struck for the first time by the punch, the teeth produced thereby appear as shown in Fig. 3; that is, there are present in the blade two groups of three large teeth 11 each separated by the trapezium-shaped tooth 12.

The blade is now fed forward, in the direction of the arrow, an amount equal to three times the pitch of the triangular teeth, that is, until the vertical cut 13 in the blade aligns itself with the vertical side of the central tooth 2ª in the punch. The latter now performs the second stroke, thereby cutting the saw-blade in the manner shown in Fig. 4.

As shown therein, the punch, indicated partly in dot and dash lines, cuts into the large tooth 12 and the two succeeding triangular teeth 11. The former is changed into a large triangular tooth 14, whereas the latter are subdivided into five small teeth 15 of the desired size, by the elimination of the small parallelogram-shaped portions 16 shown in crosshatching. Simultaneously, three new large triangular teeth 17 are produced inwardly on the blade 10. In this figure, as well as in Figs. 5 and 6, the parts produced by the punch at the stroke under consideration are shown in heavy lines, while the parts formed at the preceding stroke or strokes are shown in lighter lines and identified by their reference numbers.

Upon completion of the second stroke, the saw-blade is again advanced into the die an amount equal to three times the pitch of the triangular teeth or, until the vertical cut 18 registers with the vertical side of the tooth 2ª in the punch. The latter now executes the third stroke with the result shown in Fig. 5. It will be seen therefrom that the last large tooth 11 and two teeth 17, formed, respectively at the first and the second stroke have been transformed into six small teeth 19 by cutting away the small crosshatched portions 20 and that three additional large teeth 21 have been created in the saw-blade. By feeding the blade forward a same amount as stated before, the fourth stroke of the punch will add six new small teeth 22, by the elimination of the crosshatched portion 23, and three large triangular teeth 24.

The same operations are performed successively and continuously until the whole ribbon of steel from which the saw blades are made has been properly toothed. It will be noted that at the front and rear end of the ribbon there will remain respectively four and three large triangular teeth. These may be removed by simply cuting so much from each end of the ribbon, or else, by cutting the required amount along a line passing through the root of said large teeth. Thereupon the teeth are properly set and the ribbon is suitably cut into shorter blades of the required length.

From the foregoing it will be seen that the punching of the cutting points of the smaller teeth is performed practically by the center portion of the cutting edges of the punch, that is at the place where the latter is strongest and most easily re-ground. If the teeth of the punch were made only as large as the teeth of the saw blade, as ultimately required, the root of the teeth on the punch would have to be cut very sharp in order to produce a sharp cutting point on the teeth of the blade. This operation is rather hard to perform, for small teeth especially, and presents moreover the disadvantages of complicating the successful hardening of the punch and die, as well as reducing the wearing quality thereof.

By my process, the teeth in the punch and die may be rounded off at the top and root without affecting the sharpness of the ultimate teeth on the saw.

In the type of punches and dies used to cut teeth according to the established practice, and shown in Figs. 7 and 8, the teeth 25 are originally punched to twice the size desired in order to obtain a sharp cutting point on the saw-teeth. The inconvenience of this method is that the ribbon of steel, from which the blades are cut, has to be run through the punch and die a second time, after having been displaced longitudinally an amount equal to one-half the pitch of the large teeth in order to eliminate the small, parallelogram-shaped portions 26 to produce the small teeth 27. Another disadvantage of this process is that it necessitates the use of two milling-cutters, one being the reverse of the other, to cut the teeth in the punch and the die.

In the above, mention has been made of a punch and die composed of seven teeth; but it will be readily understood that said cutting tools could be made with more or less teeth if desired. The only requisite for the successful working of my process being that the feed of the saw-blade should not be greater than the number of teeth provided in the smaller group of large teeth lying on either side of the central notch in the punch and die, as otherwise, there would be left on the finished blade at given intervals large triangular teeth, which would, of course render the saw-blade less efficient. Also, it has been assumed throughout this specification that the oblique sides of the teeth be inclined to forty-five degrees. Although this is the angle usually found in the smaller saws, my system is just as well adapted for teeth having a different angle for the inclined side.

As suggested herein, many changes in the precise construction of the die and punch used in my process may be made without exceeding the scope of the claims, and I reserve myself the liberty of making all such changes as may be thought desirable.

What I claim is:

1. The process of cutting triangular teeth on a saw-blade in a single pass through a unitary punch and die which consists in providing on said punch and die two groups of large teeth having twice the size of the teeth required on said blade and adapted to produce between the groups of teeth in the blade a larger tooth having the shape of a trapezium, and subsequently dividing the teeth in said blade into smaller teeth by means of said unitary punch.

2. The process of cutting triangular teeth on a saw-blade in a single pass through a unitary punch and die which consists in providing on said punch and die two groups of large teeth having twice the size of the teeth required on said blade and adapted to produce between the groups of teeth in the blade a larger tooth having the shape of a trapezium, and subsequently dividing one of said groups of teeth in said blade into smaller teeth at every stroke of said punch and simultaneously producing a new group of large teeth.

3. The process of cutting triangular teeth on a saw-blade in a single pass through a unitary punch and die which consists in providing on said punch and die two groups of large teeth having twice the size of the teeth required on said blade and adapted to produce between the groups of teeth in the blade a larger tooth having the shape of a trapezium of the proportions described, and subsequently dividing one of said groups of teeth in said blade in smaller teeth at every stroke of said punch and simultaneously producing a new group of large teeth.

4. The process of cutting triangular teeth on a saw-blade in a single pass through a unitary punch and die which consists in providing on said punch and die two groups of large teeth having twice the size of the teeth required on said blade and adapted to produce between the groups of teeth in the blade a larger tooth having the shape of a trapezium of the proportions described, and subsequently dividing one of said groups of large teeth in said blade into smaller teeth of the required size and simultaneously producing a new group of large teeth by successively feeding said blade through said punch and die an amount not greater than the space occupied by the smaller group of said large teeth in said punch and die after each stroke of said punch, substantially as described.

In testimony whereof I affix my signature.

ADOLF HARTIG.